(12) United States Patent  
Greenwood (10) Patent No.: US 8,396,692 B2
(45) Date of Patent: Mar. 12, 2013

(54) SITE ULTRAVIOLET RADIATION EXPOSURE PLANNER

(75) Inventor: John Stephen Greenwood, Balmain (AU)

(73) Assignee: Webshade Pty Limited, Balmain (AU)

( * ) Notice: Subject to any disclaimer, the term of this patent is extended or adjusted under 35 U.S.C. 154(b) by 1535 days.

(21) Appl. No.: 11/288,582

(22) Filed: Nov. 29, 2005

(65) Prior Publication Data

US 2006/0173914 A1 Aug. 3, 2006

(30) Foreign Application Priority Data

Nov. 29, 2004 (AU) ................................ 2004906809

(51) Int. Cl.
G06F 17/50 (2006.01)
(52) U.S. Cl. ............................................................ 703/1
(58) Field of Classification Search .................... 703/1, 6
See application file for complete search history.

(56) References Cited

U.S. PATENT DOCUMENTS

| 6,452,188 | B1 * | 9/2002 | Chubb | 250/372 |
| 6,484,932 | B1 * | 11/2002 | Kinney et al. | 235/73 |
| 6,498,987 | B1 * | 12/2002 | Wilt et al. | 702/3 |
| 7,065,476 | B2 * | 6/2006 | Dessureault et al. | 703/2 |

OTHER PUBLICATIONS

Dr. A. Yezioro et al., "'Shading': Analyzing Mutual Shading Among Buildings", 1999, IBSPA Building Simulation 6, Kyoto, Japan, pp. 1-7.*
Dr. Andrew Marsh, "Computer-Optimised Shading Design", 2003, Eighth International IBPSA Conference, Eindhoven, Netherlands, pp. 831-838.*
S. Madronich et al., "Changes in biologically active ultraviolet radiation reaching the Earth's surface", 1998, Journal of Photchemistry and Photobiology, pp. 5-19.*
Chitrarekha Kabre, "WINSHADE: A computer design tool for solar control", 1999, Elsevier Science Ltd., pp. 263-274.*
Piers M. De F. Forster et al., "Modeling Ultraviolet Radiation at the Earth's Surface. Part II: Model and Instrument Comparison", 1995, American Meteorological Society, pp. 2426-2439.*
Kurt Kallblad, "A Method to Estimate the Shading of Solar Radiation Theory and Implementation in a Computer Program", 1999, IBPSA Building Simulation 6, Kyoto, Japan, pp. 1-7.*

* cited by examiner

*Primary Examiner* — Mary C Jacob
*Assistant Examiner* — Aniss Chad
(74) *Attorney, Agent, or Firm* — Knobbe, Martens, Olson & Bear LLP (57) ABSTRACT

A computer-enabled interactive site planner; said site planner adapted to the determination of solar radiation exposure profiles for a user-specified location; said site planner further adapted to providing data on shade providing objects and strategies for reduction of exposure risk appropriate to said user-specific location.

29 Claims, 9 Drawing Sheets

SITE ULTRAVIOLET RADIATION EXPOSURE PLANNER

RELATED APPLICATIONS

This application claims priority to Australian Provisional Application No. 2004906809 filed Nov. 29, 2004, which is hereby incorporated in its entirety by reference herein.

BACKGROUND

The present invention relates to interactive web and computer-based planning facilities and, more particularly, to a planning facility for the minimising of risk to health through exposure to ultraviolet radiation (UVR).

There has been an increasing awareness in recent years of the deleterious effects of excessive exposure to UVR. This is particularly so in Australia and New Zealand which have the highest incidence of skin cancer in the world.

Unprotected exposure to UVR continues to be the single most important modifiable risk factor for skin cancer. Although strenuous efforts at education have achieved changes in the behaviour of many groups, maximum protection from solar UVR can best be achieved through a combination of personal and environmental strategies, including the systematic modification of outdoor environments to provide solar-protective shade.

To be effective, shade-giving structures must adequately provide protection in a given location appropriate to the levels of solar radiation and to the use of that area. This involves expert analysis of the interplay of a range of factors, without which, measures required to provide shade may well be ineffectual or not taken at all. Competent and consistent expert analysis is however often difficult and expensive to obtain.

It is an object of the present invention to address or at least ameliorate some of the above disadvantages.

Note:
The term "comprising" (and grammatical variations thereof) is used in this specification in the inclusive sense of "having" or "including", and not in the exclusive sense of "consisting only of".

BRIEF DESCRIPTION OF INVENTION

Accordingly, in one broad form of the invention there is provided a computer-enabled interactive site planner; said site planner adapted to the determination of solar radiation exposure profiles for a user-specified location; said site planner further adapted to providing data on shade providing objects and strategies for reduction of exposure risk appropriate to said user-specific location.

Preferably said site planner comprises software for provision of a shade audit of a site at said user-specified location.

Preferably said shade audit includes a determination of current risk of damage from ultraviolet solar radiation.

Preferably said shade audit is adapted to assist a user of said site planner to reduce said current risk.

Preferably said site planner provides to a remote user a solar radiation exposure profile for said user-specified location based on data input by said user over the internet.

Preferably said site planner is down-loaded via the internet by a user.

Preferably said site planner includes a database for retaining data relevant to said determination of solar radiation profiles and said shade structures.

Preferably said databases include solar radiation profile data.

Preferably said databases include climatic data.

Preferably said databases include geographical site location data.

Preferably said databases include shade providing object data.

Preferably said databases include educational modules for the provision of information on risks of exposure to ultraviolet radiation and risk minimising strategies.

Preferably said databases include information on construction of shade providing structures.

Preferably said databases include shade characteristics of vegetation and construction materials.

Preferably a user of said site planner inputs data to allow said site planner to determine parameters associated with said specific location.

Preferably said user of said site planner inputs characteristics of said specific location.

Preferably said characteristics includes details of use of said specific location.

Preferably said parameters include geographic coordinates of said specific location.

Preferably said parameters include micro-climate details of said specific location.

Preferably said site planner is adapted to providing a user with a site-planning template for a user-specified site.

Preferably said site planning template includes a satellite photograph; said photograph including said user-specific site.

Preferably said site planning template includes a line drawing of structures on said user-specified site; said line drawing generated by image recognition means from said satellite photograph.

Preferably said user is provided with scalable representations of a range of shade providing objects arranged for "drag and drop" insertion into said site planning template.

Preferably said user is provided with a range of shade factors for assigning to said shade providing objects.

Preferably said range of shade providing objects includes trees and shrubs.

Preferably said range of shade providing objects includes shade providing materials.

Preferably said shade audit includes a protection level indicator based on configurations of said site planning template when submitted for evaluation by said user.

Preferably said protection level indicator includes protection levels for discreet areas identified within said specific location.

Preferably said site planner provides comfort level indicators for specific zones within said specific location.

Preferably said site planner provides data on placement of shade structures for said user-specified site.

Preferably said site planner provides data on characteristics of said shade structures.

Preferably said site planner provides links and information of suppliers of said shade providing objects.

Preferably said site planner is adapted to provide an educational tool for conveying information on solar radiation effects and protection.

Preferably said educational tool includes interactive curriculum-based resources for school use.

Preferably said site planner provides simulations of shade patterns cast by shade giving object at said use-specified site.

Preferably said simulation is static for a given time instant.

Preferably said simulation is dynamic indicating changing shade patterns over a period of time.

Preferably said site planner is enabled to integrate factors including seasonal vegetation characteristics and slope of terrain in said simulation.

In yet a further broad form of the invention there is provided a method for the determination by a user of levels of exposure to ultraviolet radiation associated with a user-specified site; said method including the steps of:
(a) providing a computer-enabled site planner to said user,
(b) said user providing site location data to said site planner,
(c) said user providing data on existing structures and vegetation of said site to said site planner.

Preferably said site planner maintains databases with data relevant to ultraviolet radiation exposure as a function of characteristics of said user-specified site provided to said site planner.

Preferably said site planner integrates data maintained in said databases with data provided for said user-specified site to produce a shade audit of said user-specified site.

Preferably said a user of the site planner is provided with a virtual representation of said user-specified site and with means for modifying shade providing characteristics of said user-specified site.

Preferably said shade audits may be generated iteratively so to derive a site plan in which risk of exposure to ultraviolet radiation is assessed and minimisation plan developed.

In yet a further broad form of the invention there is provided a method for raising awareness in school students of health risks from exposure to ultraviolet exposure; said method including the steps of:
(d) providing a school with a web-enabled software site planner,
(e) accepting input by said students into said site planner of data relevant to the location of a school attended by said students,
(f) accepting input by said students of site specific features of built and natural shade affecting objects,
(g) accepting input by said students of areas within said site and duration of time spent within said areas.

Preferably said site planner produces an output indicating exposure risk.

In yet a further broad form of the invention there is provided a web-enabled interactive site planner module; said site planner module adapted to the determination of solar radiation exposure profiles for a user-specified location; said site planner module receiving data from a remote database thereby to load said module with data specific to said user-specified location. Providing objects and strategies for reduction of exposure risk appropriate to said user-specific location.

Preferably said site planner module comprises software for provision of a shade audit of a site at said user-specified location.

Preferably said shade audit includes a determination of current risk of damage from ultraviolet solar radiation.

Preferably wherein said shade audit is adapted to assist a user of said site planner module to reduce said current risk.

Preferably said site planner module provides to a remote user a solar radiation exposure profile for said user-specified location based on data input by said user over the internet.

Preferably elements of said site planner module are downloaded via the internet by a user.

Preferably said site planner module includes a database for retaining data relevant to said determination of solar radiation profiles and said shade structures.

Preferably said databases include solar radiation profile data.

Preferably said databases include climatic data.

Preferably said databases include geographical site location data.

Preferably said databases include shade providing object data.

Preferably said databases include educational modules for the provision of information on risks of exposure to ultraviolet radiation and risk minimising strategies.

Preferably said databases include information on construction of shade providing structures.

Preferably said databases include shade characteristics of vegetation and construction materials.

Preferably a user of said site planner module inputs data to allow said site planner module to determine parameters associated with said specific location.

Preferably said user of said site planner module inputs characteristics of said specific location.

Preferably said characteristics includes details of use of said specific location.

Preferably said parameters include geographic coordinates of said specific location.

Preferably said parameters include micro-climate details of said specific location.

Preferably said site planner module is adapted to providing a user with a site-planning template for a user-specified site.

Preferably said site planning template includes a satellite photograph; said photograph including said user-specific site.

Preferably said site planning template includes a line drawing of structures on said user-specified site; said line drawing generated by image recognition means from said satellite photograph.

Preferably said user is provided with scalable representations of a range of shade providing objects arranged for "drag and drop" insertion into said site planning template.

Preferably said user is provided with a range of shade factors for assigning to said shade providing objects.

Preferably said range of shade providing objects includes trees and shrubs.

Preferably said range of shade providing objects includes shade providing materials.

Preferably said shade audit includes a protection level indicator based on configurations of said site planning template when submitted for evaluation by said user.

Preferably said protection level indicator includes protection levels for discreet areas identified within said specific location.

Preferably said site planner module provides comfort level indicators for specific zones within said specific location.

Preferably said site planner module provides data on placement of shade structures for said user-specified site.

Preferably said site planner module provides data on characteristics of said shade structures.

Preferably said site planner module provides links and information of suppliers of said shade providing objects.

Preferably said site planner module is adapted to provide an educational tool for conveying information on solar radiation effects and protection.

Preferably said educational tool includes interactive curriculum-based resources for school use.

Preferably said site planner module provides simulations of shade patterns cast by shade giving object at said use-specified site.

Preferably said simulation is static for a given time instant.

Preferably said simulation is dynamic indicating changing shade patterns over a period of time.

Preferably said site planner module is enabled to integrate factors including seasonal vegetation characteristics and slope of terrain in said simulation.

In yet a further broad form of the invention there is provided a method for the determination by a user of levels of exposure to ultraviolet radiation associated with a user-specified site; said method including the steps of:

(h) providing a software-based site planner module to said user for use in providing planning data specific to said used-specified site, (i) said user causing site location data to be provided to said site planner module, (j) said user causing data on existing structures and vegetation of said site to be provided to said site planner module.

Preferably said module is downloaded over the Internet from a remote database.

Preferably said site planner module communicates with and receives over the Internet from said remote database data relevant to ultraviolet radiation exposure as a function of characteristics of said user-specified site.

Preferably said site planner module integrates data maintained in said databases with data provided for said user-specified site to produce a shade audit of said user-specified site.

Preferably a user of said site planner module is provided with a virtual representation of said user-specified site and with means for modifying shade providing characteristics of said user-specified site.

Preferably shade audits may be generated iteratively so to derive a site plan in which risk of exposure to ultraviolet radiation is assessed and minimisation plan developed.

In yet a further broad form of the invention there is provided a method for raising awareness in school students of health risks from exposure to ultraviolet exposure; said method including the steps of:

(k) providing a school with a web-enabled software site planner module, (l) accepting input by said students into said site planner module of data relevant to the location of a school attended by said students, (m) accepting input by said students of site specific features of built and natural shade affecting objects, (n) accepting input by said students of areas within said site and duration of time spent within said areas.

Preferably said site planner module produces an output indicating exposure risk.

Preferably said site planner module includes a shade calendar; said shade calendar indicating categories of shade levels for months of a calendar year; said shade calendar further indicating apparent temperature and a related ultraviolet radiation index for each of said months.

BRIEF DESCRIPTION OF DRAWINGS

Embodiments of the present invention will now be described with reference to the accompanying drawings wherein.

DETAILED DESCRIPTION OF PREFERRED EMBODIMENTS

An feature of embodiments of the present invention is the provision of shade planning tools, which ultimately provide shade information and planning for shade providing structures which are both UVR protective and comfortable in use.

There are four specific and measurable parts of climate that influence human thermal comfort:

(a) Air temperature. If the air temperature is too high for natural perspiration to provide cooling, it will cause discomfort from overheating, (b) Breeze can assist evaporation on the skin, conducive of providing comfort if a person is overheated, but discomfort if already cold.

(c) Humidity. High humidity can prevent perspiration so that even moderately high temperature combined with high humidity can lead to discomfort.

(d) Direct sunlight or radiation can increase the perceived temperature by as much as 20° C., thus leading to increased discomfort. Indirect radiation of reflective surfaces can also have this.

To achieve shade protection from UVR yet still maintain a desired degree of human comfort, shade planning may be divided into two categories of shade; "warm shade" and "cool shade".

Warm shade needs to be provided when the temperature is cool, so that the sun's warmth and light are desirable while still requiring that UV radiation be excluded. This can be achieved by various strategies, including the correct placement of clear polycarbonate sheeting, vegetation to create a north-facing courtyard and outdoor paving (with low UV reflectance) to absorb and radiate heat. Shelter screens can be used to block out cold winter winds Cool shade is required under hot conditions. Direct radiation may be blocked or reduced by blocking sunlight with woven cloth. Trees and plants evapotranspirate during the day, cooling the air around them as well as at least partially blocking direct UV radiation. Shade structures may be required to shade paved areas and other surface which reflect UV radiation into an otherwise shaded area. Shade planning and shade structures should also take into account the direction of prevailing summer breezes.

In many situations it will be required to plan shade providing structures and features allowing a change over from warm shade to cool shade.

First Preferred Embodiment

Figure 1:
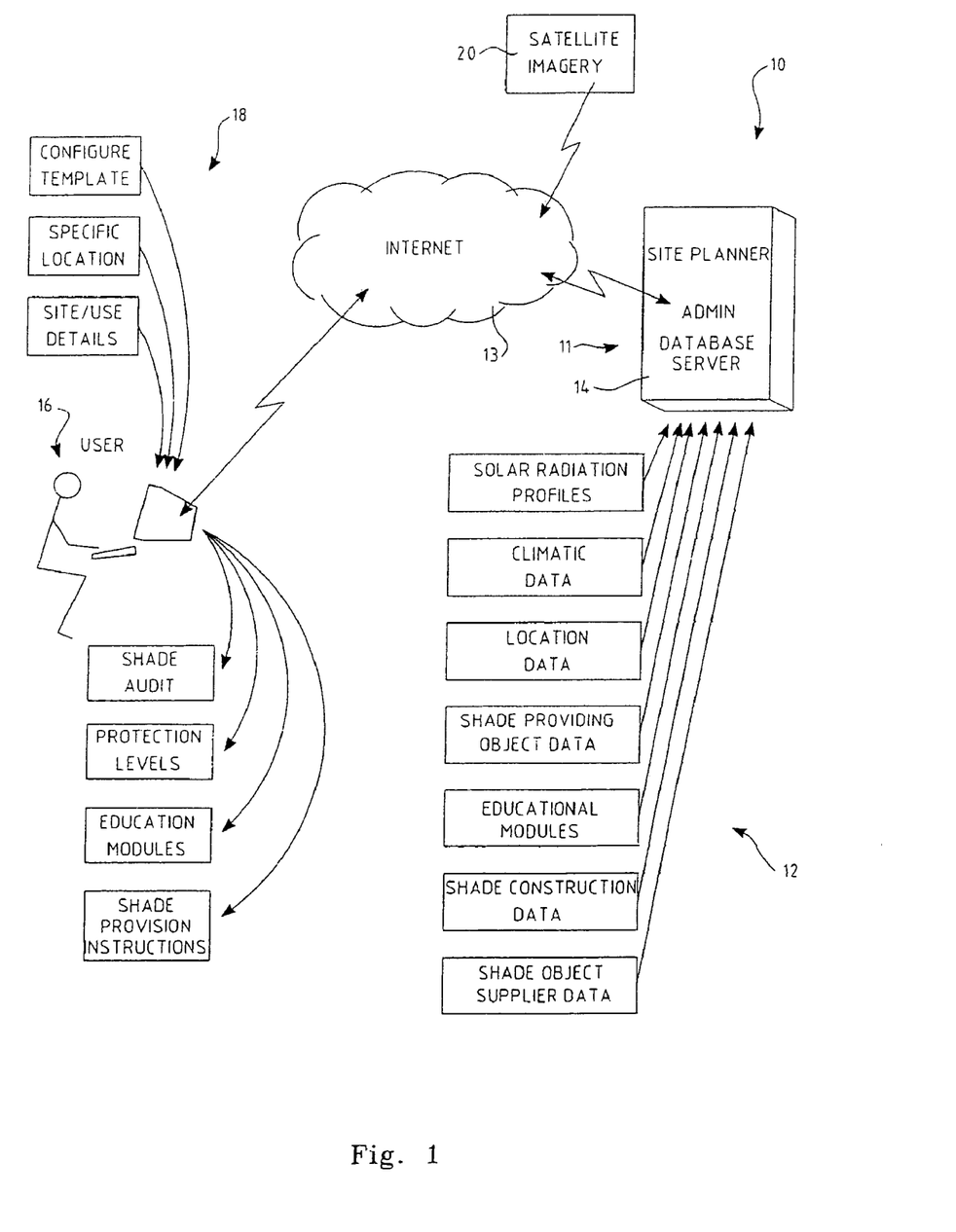
FIG. 1 is a schematic representation of a web-enabled site planner according to a preferred embodiment of the invention.

With reference to FIG. 1, a web-enabled site ultraviolet exposure planner 10 includes a site planner administering organization 11 maintaining databases 12 and server facilities 14 for the provision of a site planning service. The site planner may be accessed over the Internet 13 by users 16 for a fee. Users 16 may include individual home owners, schools, child minding centres, shade designers, shade suppliers, local government authorities and corporations as well as other public authorities overseeing public buildings and spaces.

The site planning service 10 is directed at providing a user with analysis, educational and planning tools aimed at minimizing harm from solar ultraviolet radiation (UVR), by promoting awareness of the risk, evaluating current risk for a particular location or site, and providing tools for planning shade protection measures.

For these purposes, the databases 12 maintained by the administering organization 11 include solar radiation profiles for the geographic area or areas for which the service is provided. Solar radiation profiles will include such factors as radiation intensity and sun angles for a given set of geographical coordinates and for various times of the day and seasons of the year.

The databases 12 will also contain climatic data for integration with the solar profiles so as to provide estimates of comfort levels based on temporal, location and shade condition factors.

Also maintained in databases 12, are shade providing characteristics of a range of shade providing objects. Such object will include specific types of tree and shrub species suited to particular areas together with the degree of shade offered at various times of the year. It may in conjunction contain data on best methods and times of planting and such other information as may optimise the use of such shade providing vegetation.

Characteristics of other shade providing objects may be maintained in databases 12, and may include details of various types of shade cloth, translucent panelling and other shade providing construction materials. Information may also be held on the suppliers of these materials for a given locality of a user.

An important component of a preferred embodiment of the site planner 10, is an educational facility provided by the educational modules. These are particularly adapted for school use and are structured where possible to reflect parts of the school curriculum as it addresses issues of climate and personal health and safety. In particular these modules may provide interactive facilities where students can create situations of exposure, such as for example time spent at a beach in their area at a given time of the year. The module may then provide a risk factor in conjunction for example with statistical data on deleterious health effects and strategies for exposure risk minimisation.

In at least one preferred form of the invention, the educational modules incorporate an inter-active shade planning game. Students, or other users such as workers in trades with high exposure risk, can simulate various patterns of site usage and determine their cumulative UVR exposure.

To use the site planner 10 for a shade audit or as a shade planning tool, a user 16 will firstly provide a number of inputs 18 which will include the specific site location for which an audit or planning is required. This may be input to the site planner 10 in various ways. For example, the provision of an address in a city may be translated directly into its geographical coordinates by suitable software resident on the administering organization server. Alternatively, a portion of a map of the user's locality may be displayed with the user invited to point and click on the building or space under consideration. This input is then converted by the site planner into geographical coordinates.

In at least one preferred form of the site planner, the planner uses the geographical coordinates to call up a section of a satellite image from a satellite imagery provider 20, such as for example Google Earth, which will include the user's location. In this preferred embodiment image processing software may be used to identify and delineate as a line drawing the outlines of built structures and major vegetation on the user's site.

Alternatively, the user may be asked to trace such details on the satellite image displayed and the site planner software translate such tracing into a line drawing.

In either process, the line drawing produced serves as a site planning template for the audit or shade planning operation. Before a shade audit can be made, the user will be requested to input estimates of the heights of various features such as trees and built structures, and provide an indication of the slope of the site. Alternatively, as the technology allows, altimetry data for these features may be extracted from the satellite imagery.

Some additional data may be requested from the user, such as the nature of the trees, species if known, or whether deciduous or perennial, as well as the nature of any light transmitting covered areas. Also, the user may be invited to nominate certain details of the use of the site, for example if it is a school, the outdoor areas occupied by students, and for what periods of time students are in those areas.

Figure 2:
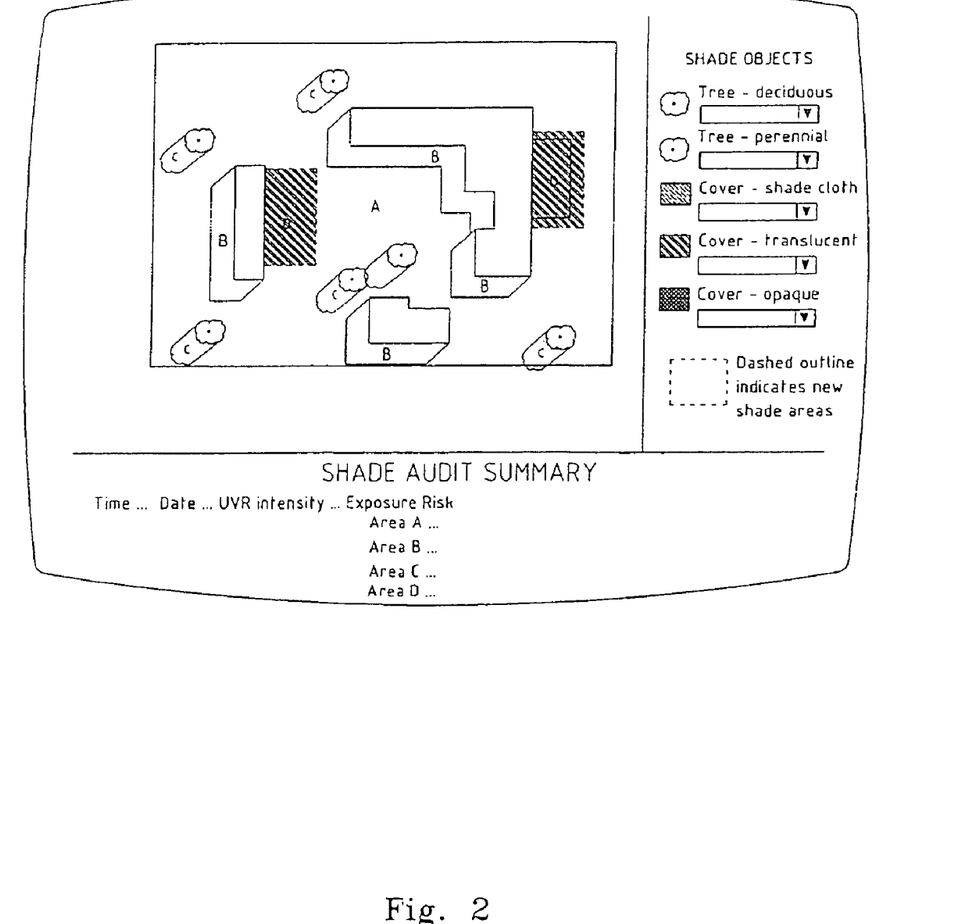
FIG. 2 is an example of a display of a site planner template and shade audit.

Once the site template is complete, the user can request a shade audit. The site planner then integrates the data provided with the sun radiation profile, climatic information, and shade characteristics of any trees and other shade giving items maintained in the databases, to assess the various areas within the site for the degree of UVR exposure. This information may be tabulated for various times of the day and for different seasons of the year. Risk assessment information based on lengths of exposure may also be provided as well as a "comfort" rating based on the typical climatic conditions at a given time. FIG. 2 shows an example of a site template and shade audit displayed on a screen for viewing by a user.

The audit then serves as a base line against which the need for any introduction of shade providing objects may be assessed. The audit will assist the user to assess if additional shade is required. This allows the user to make planning decisions which would otherwise be in the domain of expert consultants. The site planner may set out a target shade audit result to which a user may aspire in seeking to reduce the exposure risk of the site as revealed by the audit.

For a site planning exercise following an audit, a user is again presented with the site planning template. Along with a display of the site planning template, the user is presented with a pallet of shade providing objects. These will include representations of trees, pergolas and awnings for example. These objects will be scalable by the user and may be placed as desired within the template to create a virtual representation of shade-related modifications of the site. Thus modified, a new iteration of the audit can be performed and compared with the result of the base line audit. The user can continue to make changes to the template until a shade audit is achieved such that all high risk areas are reduced to at least medium risk. The software of the site planner assists the user to reduce the risks of UVR damage to people by increasing shade at the site. Currently, this is the domain expert consultants who operate without specifically designed shade planning software tools.

As well as providing a shade audit and shade planning tools, the software of the site planner enables a user to simulate the shade conditions of a site for a given time or over a time interval. The software can indicate the shadows cast at a site on a daily or annual basis, taking into account the seasonal variation of the vegetation and the slope of the terrain.

Second Preferred Embodiment

Figure 1A:
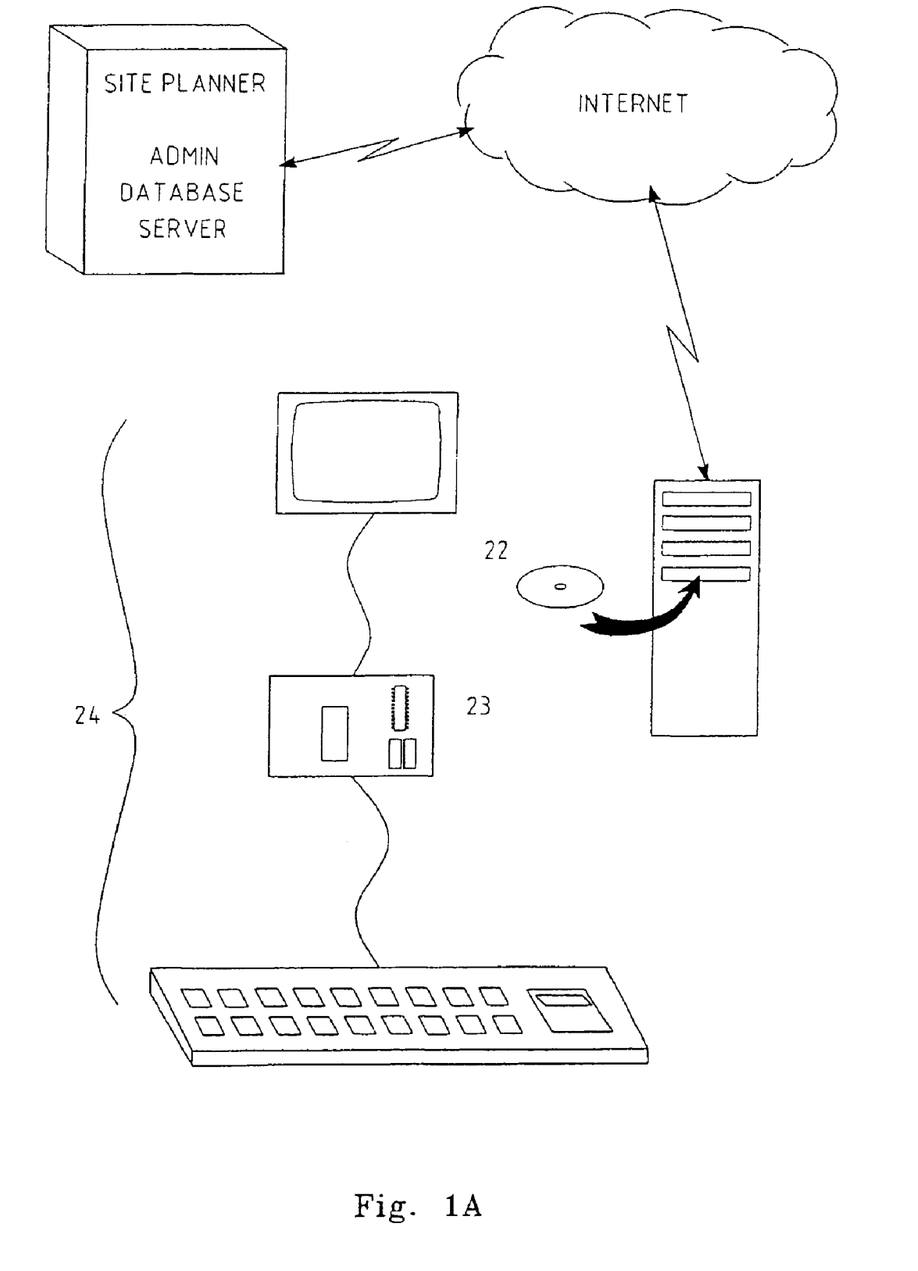
FIG. 1A is a block diagram of hardware suitable for implementing the planner of FIG. 1.

In a second preferred embodiment of the invention, the site planning exercise is primarily performed by means of site planning software resident on a local user's personal computer (PC). This software may be loaded to the PC either by downloading from the Administering Organization Internet web site on payment of a fee, or by purchasing a suitable storage medium, for example a compact disc, to which the software has been written by the Organization. As shown in FIG. 1A, the application program may be written to a compact disc 22 and loaded to memory 23 of a PC 24.

Two versions of the software are envisioned; firstly an interactive version which is enabled to access data from the Administering Organization Internet web site, and a somewhat more limited in flexibility version, being self-contained without the facility to access the Organization's web site. The two versions each provide interactive shade planning and information.

Shade Design Module.

The shade design module provides general information on the planning and design of a shade project including information on built and natural shade providing elements as well as specific shade issues for particular areas, such as around the home, child care centres, parks, swimming pools. It also provides information on aspects of climate and how climatic factors affect comfort and how shade design can ensure both protection from UV radiation and provide comfort.

Shade Modeller

The shade modeller is an interactive tool which allows iterative testing of "virtual" shade options in relation to a particular site at various times of the day and year. The site location, which can be input either as an address or as geographic coordinates, allows the software to display shade patterns from site details provided by a user. FIGS. 3 to 7 illustrate an example of an iterative shade planning sequence for a particular area, in this example, a proposed child's sand pit.

Figure 3:
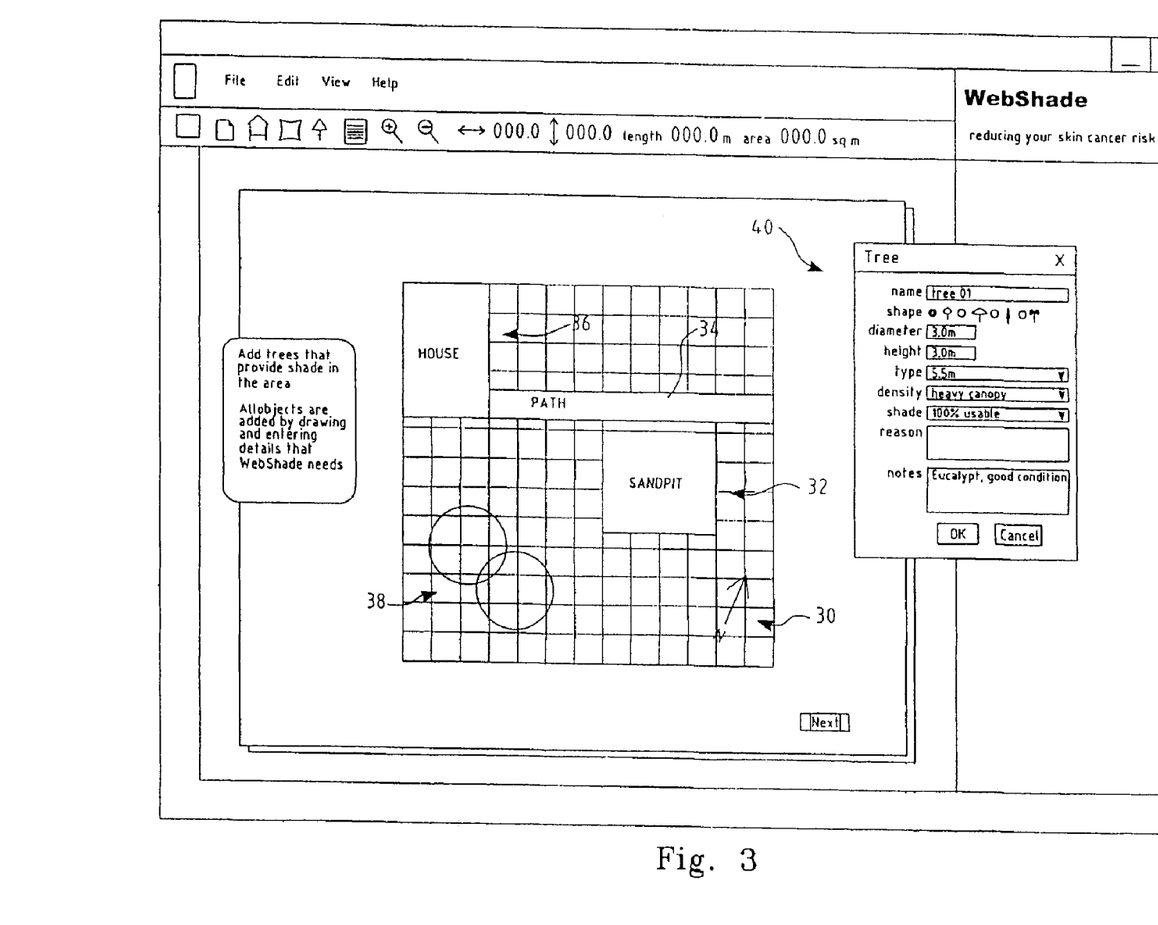
FIG. 3 is an exemplary screen output of a first step in a planning sequence according to an embodiment of the invention.

The software provides for a layout of a surface area, preferably as a grid with one meter intervals, and drawing tools allowing a user to superimpose on the grid area features relevant to the shade plan. Thus as can be seen in FIG. 3, as well as an indication of true north 30 relative to the site, an outline of the proposed sand pit 32 a path 34, the corner of a building 36 and two nearby trees 38 have been drawn approximately to scale. A dialogue box 40 is available for the user to add salient information of the tree cover.

Figure 4:
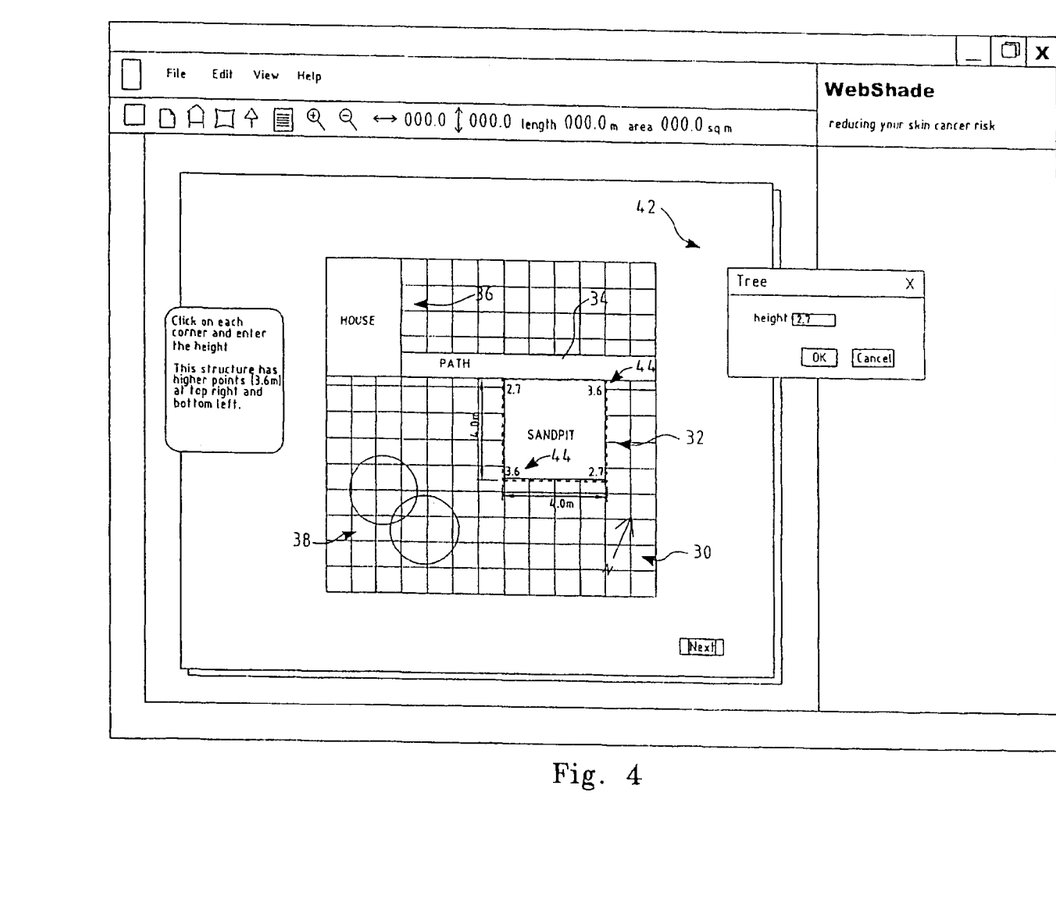
FIG. 4 is an exemplary screen output of a further step in a planning sequence according to an embodiment of the invention.

As shown in FIG. 4, the user is then invited to nominate the height of a cover over the sand pit 32. This could be entered as an average height for the whole of the cover in dialogue box or, various heights may be nominated by "clicking" on individual corners 44.

Figure 5:
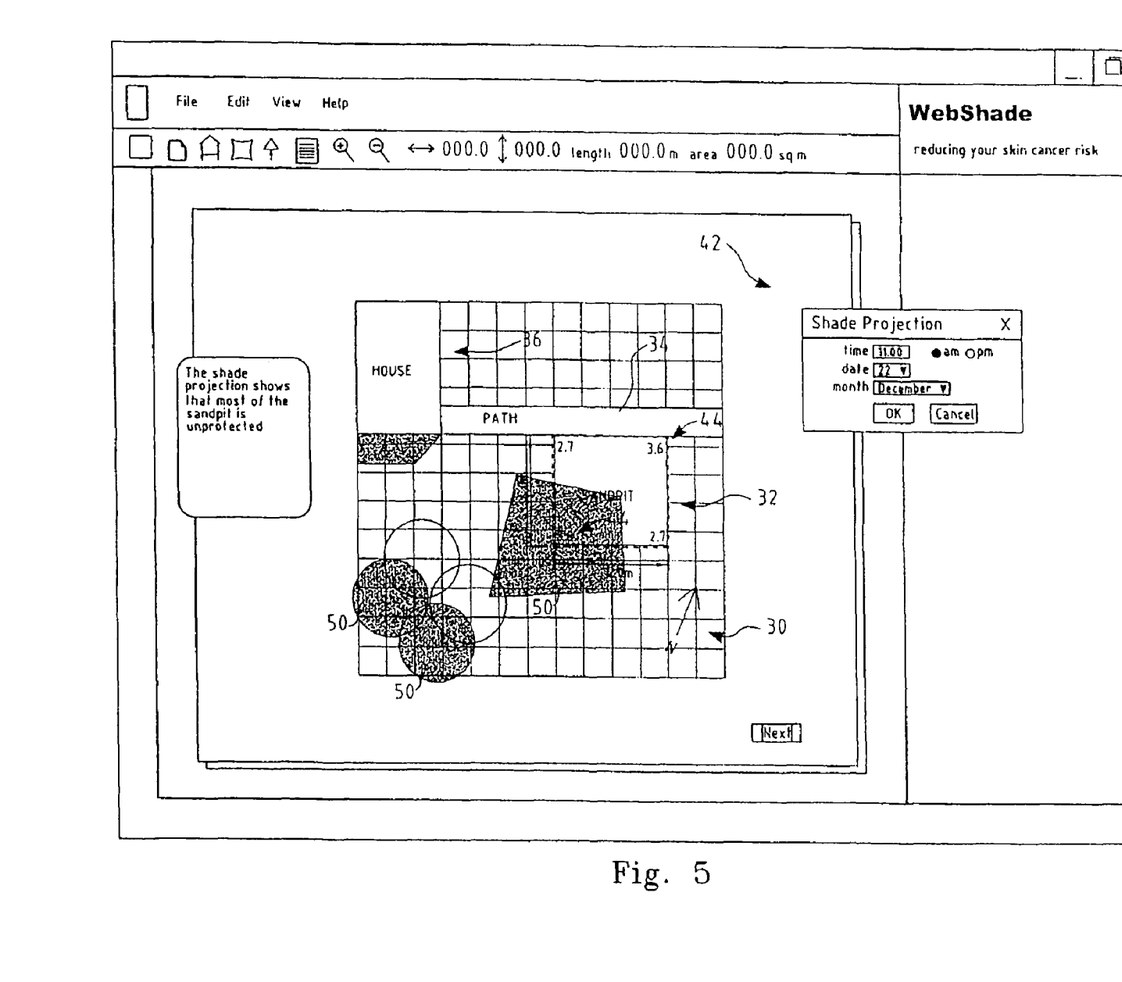
FIG. 5 is an exemplary screen output of a further step in a planning sequence according to an embodiment of the invention.
Figure 6:
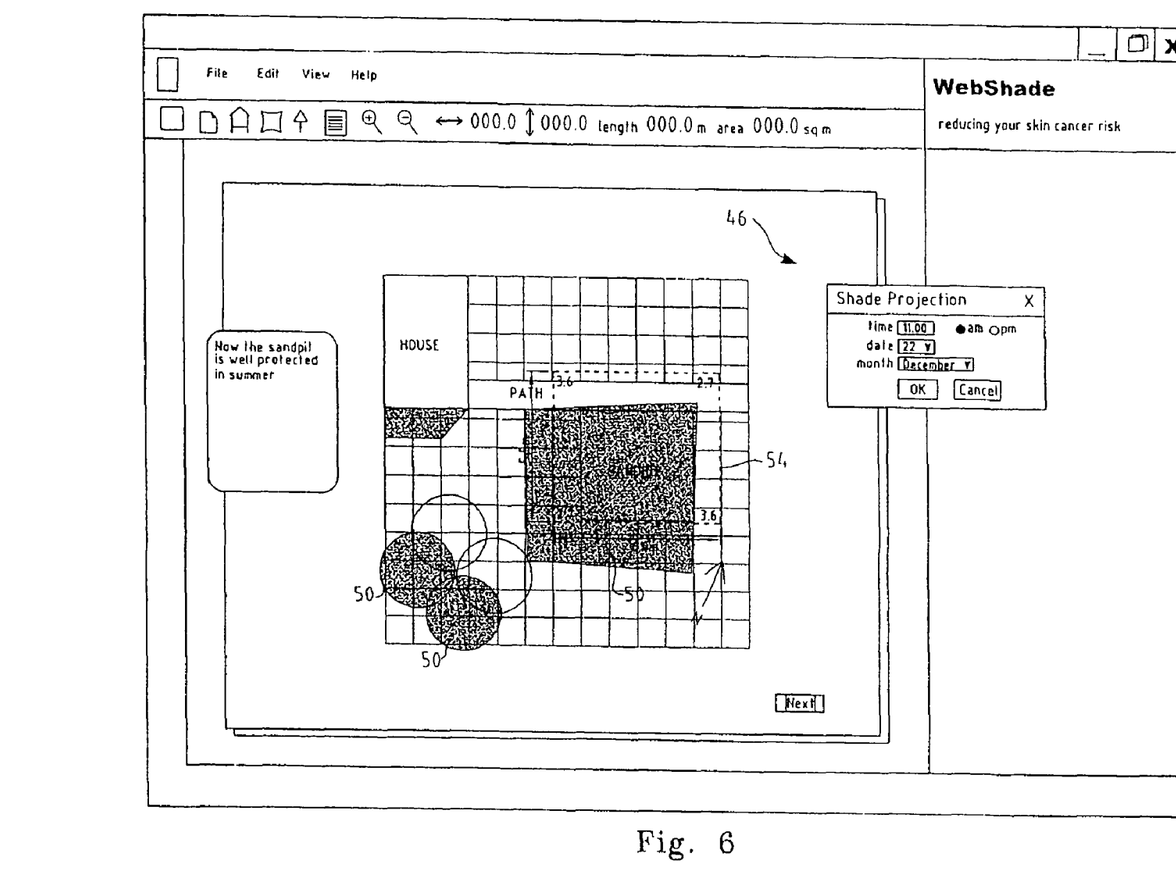
FIG. 6 is an exemplary screen output of a further step in a planning sequence according to an embodiment of the invention.

In a next step, as shown in FIG. 5, a dialogue box 46 invites entry of time of day and year, which then triggers the software to indicate the projected shade areas 50. It is then clear to the user if this shade is adequate to protect the nominated area of the sand pit 32. The software analyses the shade area and provides advice 52 that the shade is inadequate. The user is then offered the option to modify the area 54 and heights of the shade structure until an adequate shade result is achieved as shown in FIG. 6.

Figure 7:
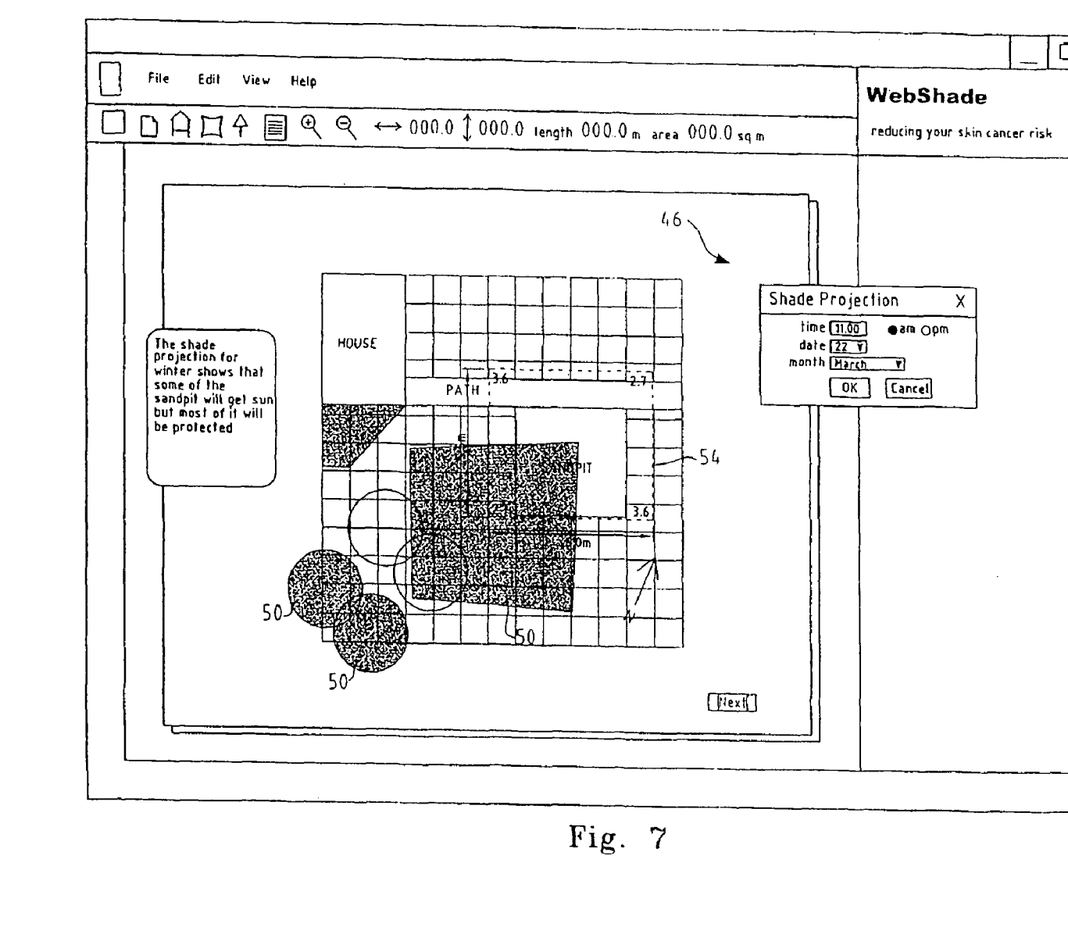
FIG. 7 is an exemplary screen output of a further step in a planning sequence according to an embodiment of the invention.

The software further provides the option to now test how the proposed shade structure will function at other times of the day and year by changing the time of day and/or time of year in the provided dialogue box 46; for example in winter when it may be desirable to have at least some sunlight reaching the sand pit area, as shown in FIG. 7.

Shade Audit

The shade audit module of the software allows a user to assess the shade needs of a particular site against site usage. It does this from a number of user-defined inputs including any existing shade providing structures and vegetation together with usage patterns of the site. Usage patterns will include details of the timing, duration and location of outdoor activities. Use of the shade audit can help prevent dangerous levels of exposure to UV radiation by changing the way the site is used, making better use of existing shade and by indicating where new or additional shade should be provided.

User-supplied details for the shade audit module are entered on a Site Observation guide, downloaded and printed from the Administering Organization web site or made available from the stand-alone version of the software on a PC. The geographic location, relation to true north, physical layout and features of the site and details of usage, including the times of day and year, and the outdoor areas used are recorded.

Using drawing tools provided by the software, a detailed drawing of the site is prepared, showing in outline all existing structures, shade providing vegetation and their heights. Also outlined on the drawing are particular areas of usage and activities, in particular areas where users spend significant periods in the open. The software can then be used to generate shade patterns for various selected times of the day and year and provide UV radiation risk rating and the amount of extra shade required to reduce the risk to acceptable levels.

Shade Calendar

Figure 8:
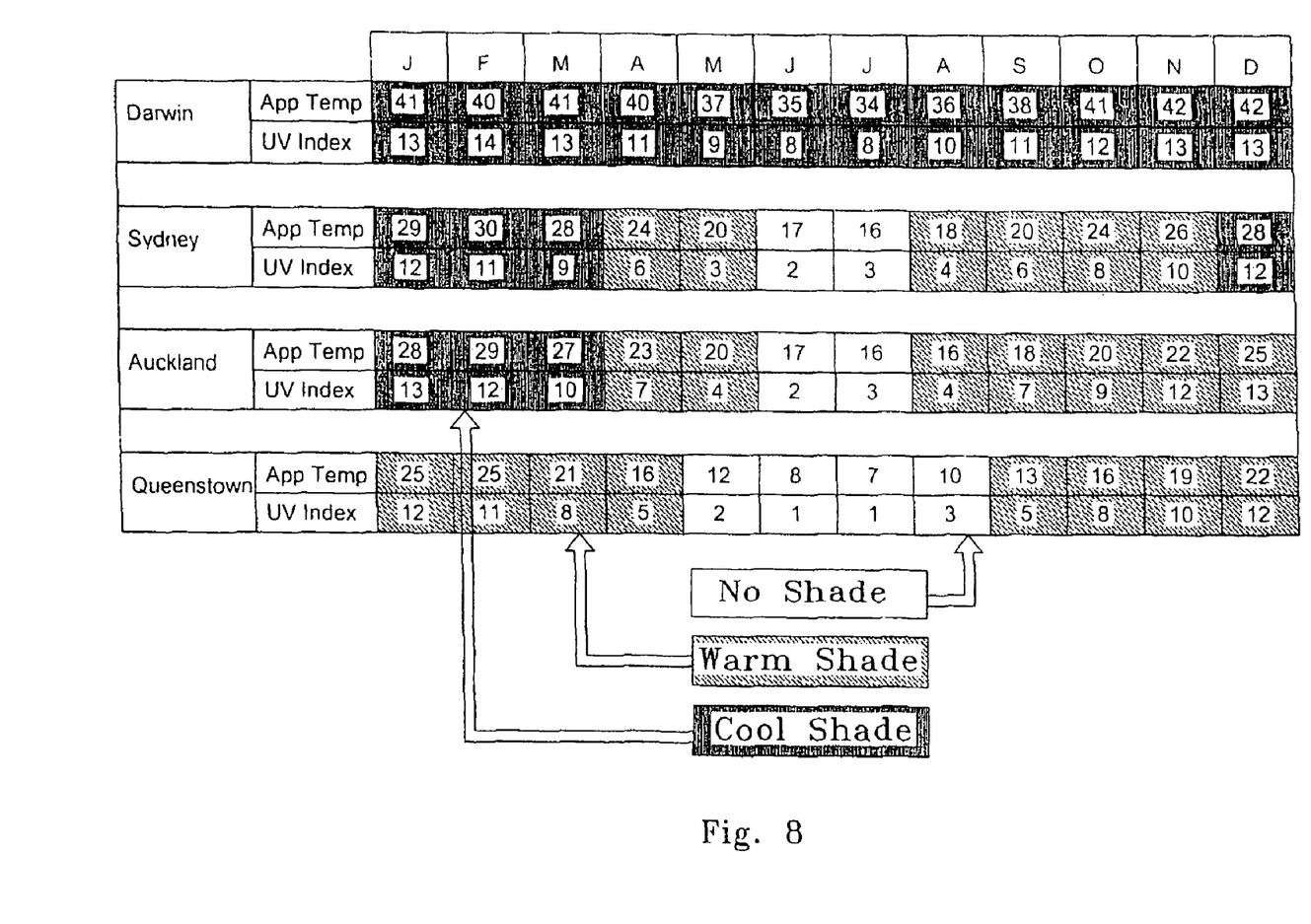
FIG. 8 is a representation of a shade calendar according to a further embodiment of the present invention.

FIG. 8 is a representation of a shade calendar for a selection of locations in the southern hemisphere. The shade calendar is for use with the exposure planner of the invention showing the typical apparent air temperature for a given month and the related UV radiation index value. It serves to link a local climate to the shade requirements of a user over the period of a calendar year, indicating the level of shade required to maintain UV radiation exposure within acceptable limits.

In particular, the shade calendar distinguishes between periods requiring cool shade in which sunlight and UV radiation are blocked, warm shade which allows exposure to sunlight but not to UV radiation, and no shade, when exposure to direct sunlight is not harmful. Periods of "no shade" are mainly restricted to the higher latitudes.

The software determines the various categories of shade indicated by the calendar based on a climate index of "apparent temperature", which combines the effects of temperature, humidity and prevailing wind patterns on human comfort with the UV radiation index.

The above describes only some embodiments of the present invention and modifications, obvious to those skilled in the art, can be made thereto without departing from the scope and spirit of the present invention.

What is claimed is:

1. A non-transitory computer readable medium for carrying or having computer-executable instructions or data structures stored thereon which when executed implements an ultraviolet risk exposure evaluation module configured:
   a. to provide a site planning template; said template including features of existing and proposed shade producing structures and vegetation of a selected site;
   b. to determine the degree, or risk, of exposure to ultraviolet radiation for a user-specified location within said selected site;
   c. to output ultraviolet exposure risk assessments and ultraviolet exposure risk minimization strategies for said user-specified location as a function of at least the timing, duration and location of use of said user-specified location.

2. The medium of claim 1 wherein said ultraviolet risk exposure evaluation module is further configured to provide a shade audit of said user-specified location.

3. The medium of claim 2 wherein said shade audit includes a determination of current risk of damage from ultraviolet solar radiation.

4. The medium of claim 2 wherein said shade audit is adapted to assist a user of said ultraviolet risk exposure evaluation module to reduce said current risk.

5. The medium of claim 1 wherein said ultraviolet risk exposure evaluation module provides to a remote user a solar radiation exposure profile for said user-specified location based on data input by said user over the internet.

6. The medium of claim 1 wherein elements of said ultraviolet risk exposure evaluation module are down-loaded via the Internet by a user.

7. The medium of claim 1 wherein said ultraviolet risk exposure evaluation module includes a database for retaining data relevant to determination of solar radiation exposure profiles and shade structures.

8. The medium of claim 7 wherein said databases include solar radiation profile data.

9. The medium of claim 7 wherein said databases include climatic data.

10. The medium of claim 7 wherein said databases include geographical site location data.

11. A method for the determination by a user of levels of exposure to ultraviolet radiation associated with a user-specified site; said method including the steps of:
   a) providing a computer readable medium incorporating an ultraviolet risk exposure evaluation module to said user,
   b) said user providing site location data to said ultraviolet risk exposure evaluation module,
   c) said user providing data on existing structures and vegetation of said site to said ultraviolet risk exposure evaluation module,
   d) a site planner element of said module integrating said provided data with a sun radiation profile and climatic information for said site to provide ultraviolet radiation exposure risk at various locations within said site.

12. The method of claim 11 wherein said ultraviolet risk exposure evaluation module provides access to databases with data relevant to ultraviolet radiation exposure as a function of characteristics of said user-specified site provided to said site planner.

13. The method of claim 12 wherein said ultraviolet risk exposure evaluation module integrates data maintained in said databases with data provided for said user-specified site to produce a shade audit of said user-specified site.

14. The method of claim 11 wherein a user of said ultraviolet risk exposure evaluation module is provided with a virtual representation of said user-specified site and with means for modifying shade providing characteristics of said user-specified site.

15. The method of claim 11 wherein shade audits may be generated iteratively so to derive a site plan in which risk of exposure to ultraviolet radiation is assessed and minimisation plan developed.

16. A non-transitory computer readable medium comprising computer executable instructions that when executed by a processor implements an ultraviolet risk exposure evaluation module configured:
   to determine solar radiation exposure profiles for a user-specified location based on a site planning template which includes features of existing and proposed shade producing structures and vegetation within said user specified location;
   to receive data from a remote database thereby to load said module with data specific to said user-specified location;
   to provide data of objects and strategies for reduction of exposure risk at said user-specific location; and
   wherein said ultraviolet risk exposure evaluation module is web-enabled for interactive use by a user of said module.

17. The ultraviolet risk exposure evaluation module of claim 16 wherein said ultraviolet risk exposure evaluation module comprises software for provision of a shade audit of a site at said user-specified location.

18. The ultraviolet risk exposure evaluation module of claim 17 wherein said shade audit includes a determination of current risk of damage from ultraviolet solar radiation.

19. The ultraviolet risk exposure evaluation module of claim 17 wherein said shade audit is adapted to assist a user of said risk exposure evaluation module to reduce said current risk.

20. The ultraviolet risk exposure evaluation module of claim 16 wherein said risk exposure evaluation module provides to a remote user a solar radiation exposure profile for said user-specified location based on data input by said user over the Internet.

21. The ultraviolet risk exposure evaluation module of claim 16 wherein elements of said risk exposure evaluation module are down-loaded via the Internet by a user.

22. The ultraviolet risk exposure evaluation module of claim 21 wherein said module is downloaded over the Internet from a remote database.

23. The ultraviolet risk exposure evaluation module of claim 21 wherein said ultraviolet risk exposure evaluation module communicates with and receives over the Internet from said remote database data relevant to ultraviolet radiation exposure as a function of characteristics of said user-specified site.

24. The ultraviolet risk exposure evaluation module of claim 21 wherein said ultraviolet risk exposure evaluation module integrates data maintained in said databases with data provided for said user-specified site to produce a shade audit of said user-specified site.

25. The ultraviolet risk exposure evaluation module of claim 21 wherein a user of said ultraviolet risk exposure evaluation module is provided with a virtual representation of said user-specified site and with means for modifying shade providing characteristics of said user-specified site.

26. The method of claim 21 wherein shade audits may be generated iteratively so to derive a site plan in which risk of exposure to ultraviolet radiation is assessed and minimisation plan developed.

27. A method for raising awareness in school students of health risks from exposure to ultraviolet exposure; said method including the steps of:
   (a) providing a school with computer readable media incorporating an ultraviolet risk exposure evaluation module,
   (b) accepting input by said students into said ultraviolet risk exposure evaluation module of data relevant to the location of a school attended by said students,
   (c) accepting input by said students of site specific features of built and natural shade affecting objects,
   (d) accepting input by said students of areas within said site and duration of time spent within said areas,
   (e) a site planner element of said module integrating said provided data with a sun radiation profile and climatic information for said site to provide ultraviolet radiation risk factors in conjunction with statistical data on deleterious health effects associated with said exposure, and
   (f) providing feedback to said students based on input of said shade specific features of built and natural shading affecting objects compared to a base line audit calculated from said statistical data on deleterious health effects associated with said exposure.

28. The method of claim 27 wherein said ultraviolet risk exposure evaluation module produces an output indicating exposure risk.

29. The method of claim 27 wherein said ultraviolet risk exposure evaluation module includes a shade calendar; said shade calendar indicating categories of shade levels for months of a calendar year; said shade calendar further indicating apparent temperature and a related ultraviolet radiation index for each of said months.

* * * * *